US011455128B2

(12) United States Patent
Yamada

(10) Patent No.: US 11,455,128 B2
(45) Date of Patent: Sep. 27, 2022

(54) COMMUNICATION METHOD, NON-TRANSITORY COMPUTER-READABLE STORAGE MEDIUM STORING PROGRAM, AND COMMUNICATION SYSTEM

(71) Applicant: Seiko Epson Corporation, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/472,969

(22) Filed: Sep. 13, 2021

(65) Prior Publication Data
US 2022/0083288 A1 Mar. 17, 2022

(30) Foreign Application Priority Data
Sep. 14, 2020 (JP) .............................. JP2020-153574

(51) Int. Cl.
*G06F 3/12* (2006.01)
(52) U.S. Cl.
CPC .......... *G06F 3/1206* (2013.01); *G06F 3/1245* (2013.01); *G06F 3/1276* (2013.01); *G06F 3/1288* (2013.01)
(58) Field of Classification Search
None
See application file for complete search history.

(56) References Cited

U.S. PATENT DOCUMENTS

| 6,671,063 | B1 | 12/2003 | Iida | |
|---|---|---|---|---|
| 6,684,088 | B1 * | 1/2004 | Halahmi | H04L 67/04 455/566 |
| 8,982,223 | B2 * | 3/2015 | Hirota | H04N 21/8153 348/211.3 |
| 9,292,173 | B2 * | 3/2016 | Matsuo | G06F 3/0482 |
| 2001/0016859 | A1 * | 8/2001 | Sekido | G06F 3/0483 715/273 |
| 2010/0118350 | A1 * | 5/2010 | Allwright | H04N 1/00225 358/402 |
| 2012/0249808 | A1 | 10/2012 | Hirota et al. | |
| 2020/0167112 | A1 | 5/2020 | Oshima et al. | |

FOREIGN PATENT DOCUMENTS

| JP | 2000-224365 | 8/2000 |
|---|---|---|
| JP | 2012-217166 | 11/2012 |
| JP | 2020-082468 | 6/2020 |

* cited by examiner

*Primary Examiner* — Paul F Payer
(74) *Attorney, Agent, or Firm* — Workman Nydegger

(57) ABSTRACT

A communication method for a personal computer configured to transmit document data constituted by a plurality of pages includes generating a first divided data element and a second divided data element by dividing the document data into predetermined units, generating a first thumbnail image data element in accordance with the generated first divided data element, transmitting the generated first thumbnail image data element, generating a second thumbnail image data element in accordance with the generated second divided data element, transmitting the generated second thumbnail image data element, and after transmitting the first thumbnail image data element, starting transmitting the document data.

20 Claims, 5 Drawing Sheets

COMMUNICATION METHOD, NON-TRANSITORY COMPUTER-READABLE STORAGE MEDIUM STORING PROGRAM, AND COMMUNICATION SYSTEM

The present application is based on, and claims priority from JP Application Serial Number 2020-153574, filed Sep. 14, 2020, the disclosure of which is hereby incorporated by reference herein in its entirety.

BACKGROUND

1. Technical Field

The present disclosure relates to a communication method, a non-transitory computer-readable storage medium storing a program, and a communication system.

2. Related Art

Technologies of transmitting reduced data obtained by reducing original data have been known. For example, JP-A-2012-217166 discloses an Internet-based image sharing service that can achieve speedy data transfer by transmitting, in accordance with communication environment or condition, a selected image or a reduced image obtained by downsizing the selected image.

The transferred data may be displayed by a device different from the device transmitting the data, as described as the image data in JP-A-2012-217166. However, the technology in JP-A-2012-217166 has been made without consideration of the possibility that a plurality of pages may constitute data to be transmitted. As a result, the device different from the device transmitting the data cannot always display an image constituted by a plurality of pages in a speedy manner.

SUMMARY

According to an aspect of the present disclosure, a communication method for a transmission device configured to transmit document data constituted by a plurality of pages includes generating a first divided data element and a second divided data element by dividing the document data into predetermined units, generating a first thumbnail image data element in accordance with the generated first divided data element, transmitting the generated first thumbnail image data element, generating a second thumbnail image data element in accordance with the generated second divided data element, transmitting the generated second thumbnail image data element, and after transmitting the first thumbnail image data element, starting transmitting the document data.

According to another aspect of the present disclosure, a non-transitory computer-readable storage medium stores a program to be executed by a computer serving as a transmission device configured to transmit document data constituted by a plurality of pages. The program includes generating a first divided data element and a second divided data element by dividing the document data into predetermined units, generating a first thumbnail image data element in accordance with the generated first divided data element, transmitting the generated first thumbnail image data element, generating a second thumbnail image data element in accordance with the generated second divided data element, transmitting the generated second thumbnail image data element, and after transmitting the first thumbnail image data element, starting transmitting the document data.

According to a further aspect of the present disclosure, a communication system includes a server, a transmission device configured to transmit document data constituted by a plurality of pages to the server, and a display terminal configured to display the document data transmitted by the transmission device via the server. The transmission device includes an executor and a communicator. The executor is configured to execute a printer driver for generating a first divided data element and a second divided data element by dividing the document data into predetermined units and for generating a first thumbnail image data element in accordance with the generated first divided data element and a second thumbnail image data element in accordance with the generated second divided data element. The communicator is configured to transmit the first thumbnail image data element to the server, transmit the second thumbnail image data element to the server after transmitting the first thumbnail image data element, and transmit the first divided data element and the second divided data element after transmitting the first thumbnail image data element. The server includes a memory and a server communicator. The memory is configured to store the first thumbnail image data element, the second thumbnail image data element, the first divided data element, and the second divided data element that are transmitted by the transmission device. The server communicator is configured to transmit the first thumbnail image data element and the second thumbnail image data element, transmit the first divided data element after transmitting the first thumbnail image data element, and transmit the second divided data element after transmitting the second thumbnail image data element. The display terminal includes a terminal communicator, a display, and a terminal controller. The terminal communicator is configured to receive the first thumbnail image data element, the second thumbnail image data element, the first divided data element, and the second divided data element. The display is configured to display a first thumbnail image represented by the first thumbnail image data element and a second thumbnail image represented by the second thumbnail image data element. The terminal controller is configured to control displaying on the display, to generate a display thumbnail image based on the received first divided data element, and to display the generated display thumbnail image as a replacement for the first thumbnail image.

DESCRIPTION OF EXEMPLARY EMBODIMENTS

First Embodiment

Figure 1:
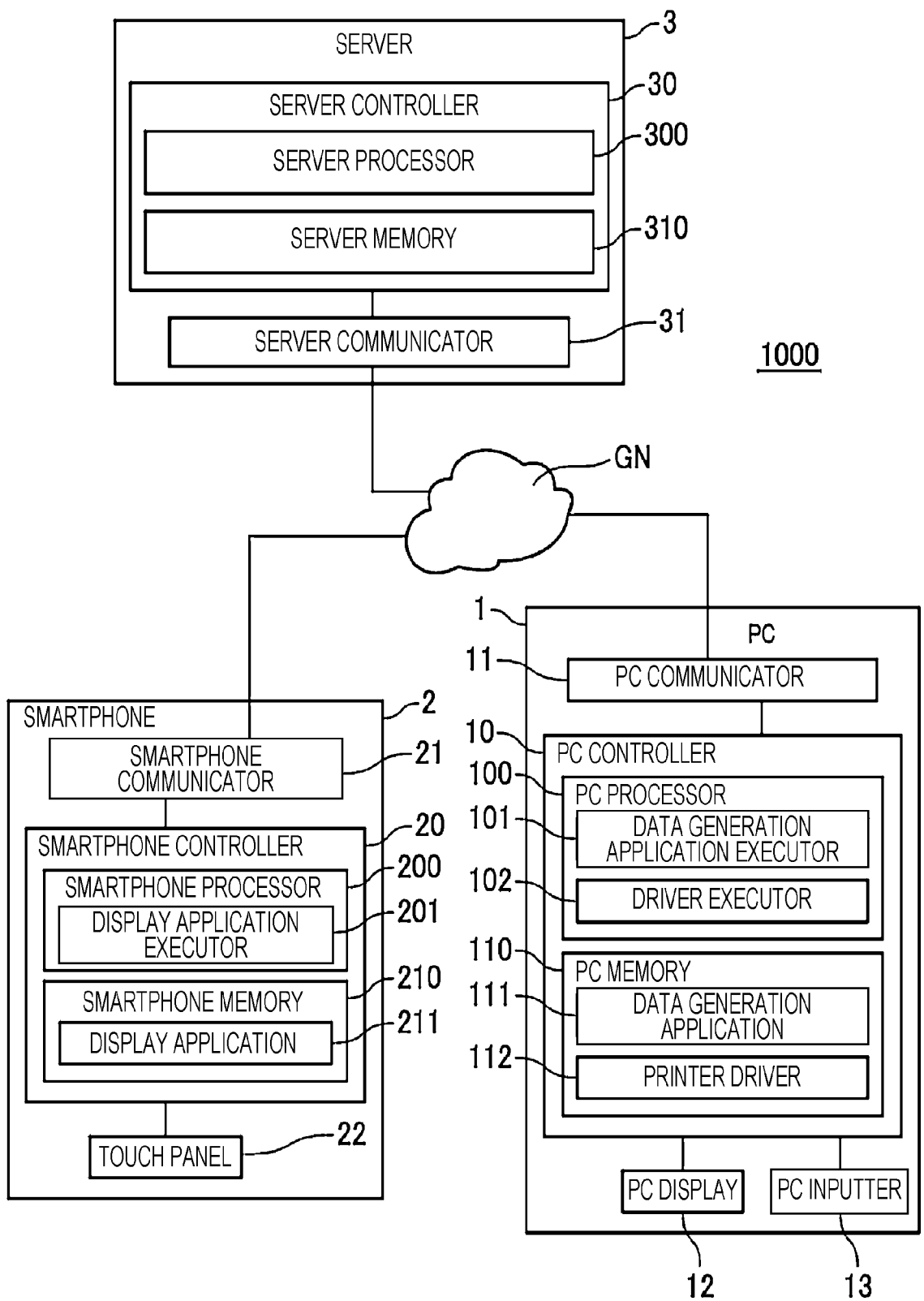
FIG. 1 illustrates a configuration of a communication system.

FIG. 1 illustrates a configuration of a communication system 1000. The communication system 1000 includes a personal computer (PC) 1, a smartphone 2, and a server 3. The PC 1, the smartphone 2, and the server 3 are connected to a global network GN. The global network GN may include, for example, dedicated lines, public networks, and the Internet. The PC 1 corresponds to an example of a transmission device. The smartphone 2 corresponds to an example of a display terminal.

The PC 1 is used by a user of the smartphone 2. The PC 1 may be a notebook, desktop, or tablet computer. A printer driver 112 is installed on the PC 1.

The printer driver 112 implements a function of generating print data processable with a command language of a printer 1 connected to the PC 1 or print data corresponding to a command language of another printer not illustrated in the drawings. The printer driver 112 also implements a function of converting the data format of document data generated by using a data generation application 111 into a format such as Portable Document Format (PDF). Document data is generated from a document consisting of a plurality of pages. The printer driver 112 implements a function of generating, in accordance with document data generated by using the data generation application 111, thumbnail image data elements to display thumbnail images SG corresponding to the pages of a document represented by the document data. The printer driver 112 also implements a function of transmitting PDF document data and generated thumbnail image data elements.

The data generation application 111 is an application program for generating document data. The document data generated by using the data generation application 111 may be in the PDF format or another format than the PDF format. The printer driver 112 corresponds to an example of a program stored in a non-transitory computer-readable storage medium. The PDF format corresponds to an example of a first data format. Another format than the PDF format corresponds to an example of a second data format. In the following description, document data in the PDF format will be referred to as "PDF document data".

The smartphone 2 is used by a user. A display application 211 is installed on the smartphone 2. The display application 211 is an application program for displaying PDF images represented by PDF document data transmitted by the PC 1 and the thumbnail images SG represented by the thumbnail image data elements transmitted by the PC 1.

The server 3 is a server device for performing predetermined processing operations in accordance with requests from clients connected to the global network GN. The server 3 transmits data obtained by performing the processing operations to the clients. Although the server 3 is illustrated as one block in the drawing, the server 3 is not necessarily implemented as a single server device. A push server for push communications described later is different from the server 3. The server 3 may be constituted by a plurality of server devices including the push server. The server 3 can be implemented in any form when the server 3 can perform various processing operations described later.

Next, a configuration of the PC 1, a configuration of the smartphone 2, and a configuration of the server 3 will be described.

The PC 1 includes a PC controller 10, a PC communicator 11, a PC display 12, and a PC inputter 13.

The PC controller 10 includes a PC processor 100, which is a processor, such as a central processing unit (CPU) or microprocessor unit (MPU), configured to run programs, and a PC memory 110. The PC controller 10 controls the individual units of the PC 1. In the PC controller 10, the PC processor 100 reads programs stored in the PC memory 110 and performs various processing operations by using hardware and software. The PC processor 100 of the PC controller 10 operates as a data generation application executor 101 by running the data generation application 111 stored in the PC memory 110. The PC processor 100 runs the printer driver 112 stored in the PC memory 110, such that the PC controller 10 operates as a driver executor 102. The PC processor 100 corresponds to an example of a computer. The driver executor 102 corresponds to an example of an executor.

The PC memory 110 stores programs to be run by the PC processor 100 and data to be processed by the PC processor 100. The PC memory 110 stores programs to be run by the PC processor 100, the data generation application 111, the printer driver 112, and various kinds of data. The PC memory 110 has a non-volatile storage area. The PC memory 110 may have a volatile storage area and form a work area for the PC processor 100.

The PC communicator 11, which includes a communication hardware device for communications according to a given communication standard, communicates with the server 3 connected through the global network GN under the control of the PC controller 10. The PC communicator 11 transmits various kinds of data such as thumbnail image data elements described later and document data to the server 3. The PC communicator 11 corresponds to an example of a communicator.

The PC display 12 is a display including light-emitting diodes (LEDs) or organic light-emitting diode (OLEDs). The PC display 12 displays information in a given form under the control of the PC controller 10. The PC display 12 may be an external device connected to the PC 1.

The PC inputter 13 is an input interface connected to input means such as an operation switch installed in the PC 1, a panel for input by touch gestures, a mouse, or a keyboard and configured to detect a user's input operation and output the detected result to the PC controller 10. The PC controller 10 performs a processing operation corresponding to an input operation in accordance with input from the PC inputter 13.

The data generation application executor 101 generates document data and outputs the generated document data to the driver executor 102. The data generation application executor 101 generates document data representing a document consisting of a plurality of pages.

In accordance with the document data generated by the data generation application executor 101, the driver executor 102 generates print data processable with a given command language. The driver executor 102 has a function of converting the data format of document data generated by the data generation application executor 101 into the PDF format when the data format of the document data is different from the PDF format. The driver executor 102 also has a function of dividing document data into a plurality of divided document data elements. The function of dividing may include dividing PDF document data to generate divided PDF document data elements. When the data format of document data is different from the PDF format, the driver executor 102 may generate divided document data elements in the original format. The divided document data element corresponds to an example of a divided data element. The driver executor 102 generates a thumbnail image data element in accordance with document data. The driver executor 102 may generate thumbnail image data elements in, for example, the PDF format, the Joint Photographic Experts Group (JPEG) format, or the bitmap format. When thumbnail image data elements are formed in the PDF format, the driver executor 102 generates a thumbnail image data element in a size less than the size of PDF document data. The driver executor 102 controls the PC communicator 11 to transmit PDF document data to the server 3. The driver executor 102 may transmit in a push manner a thumbnail image data element to the smartphone 2 via the server 3. The driver executor 102 may transmit a thumbnail image data element along a path via the push server, which is different from the path for transmitting PDF document data via the server 3.

The smartphone 2 includes a smartphone controller 20, a smartphone communicator 21, and a touch panel 22.

The smartphone controller 20 includes a smartphone processor 200, which is a processor, such as a CPU or MPU, configured to run programs, and a smartphone memory 210. The smartphone controller 20 controls the individual units of the smartphone 2. In the smartphone controller 20, the smartphone processor 200 reads programs stored in the smartphone memory 210 and performs various processing operations by using hardware and software. The smartphone processor 200 runs the display application 211 stored in the smartphone memory 210, such that the smartphone controller 20 operates as a display application executor 201. The smartphone controller 20 corresponds to an example of a terminal controller.

The smartphone memory 210 stores programs to be run by the smartphone processor 200 and data to be processed by the smartphone processor 200. The smartphone memory 210 stores programs to be run by the smartphone processor 200, the display application 211, and various kinds of data. The smartphone memory 210 has a non-volatile storage area. The smartphone memory 210 may have a volatile storage area and form a work area for the smartphone processor 200. The smartphone memory 210 corresponds to an example of a terminal memory.

The smartphone communicator 21, which includes a communication hardware device for communications according to a given communication standard, communicates with the server 3 connected through the global network GN under the control of the smartphone controller 20. As will be described later, the smartphone communicator 21 submits a request to the server 3 to receive PDF document data. The smartphone communicator 21 corresponds to an example of a terminal communicator.

The touch panel 22 includes a display panel, such as a liquid crystal display panel, and a touch sensor provided on the display panel or in combination with the display panel. The display panel displays various images under the control of the smartphone controller 20. The touch sensor detects a touch input and outputs the touch input to the smartphone controller 20. In accordance with the input from the touch sensor, the smartphone controller 20 performs a processing operation corresponding to the touch input. The touch panel 22 corresponds to an example of a display.

The display application executor 201 controls the smartphone communicator 21 to exchange various kinds of information with the server 3. The display application executor 201 executes the display application 211 to cause the touch panel 22 to display a plurality of user interface screens. When the plurality of user interface screens are not distinguished from each other, the user interface screen is referred to as an application user interface (UI) 202. The display application executor 201 causes the touch panel 22 to display the application UI 202 so as to provide various kinds of information to a user and receive various instructions from the user.

The server 3 includes a server controller 30 and a server communicator 31.

The server controller 30 includes a server processor 300, which is a processor, such as a CPU or MPU, configured to run programs, and a server memory 310. The server controller 30 controls the individual units of the server 3. In the server controller 30, the server processor 300 reads programs stored in the server memory 310 and performs various processing operations by using hardware and software. The server memory 310 corresponds to an example of a memory.

The server memory 310 stores programs to be run by the server processor 300 and data to be processed by the server processor 300. The server memory 310 stores programs to be run by the server processor 300 and various kinds of data. The server memory 310 has a non-volatile storage area. The server memory 310 may have a volatile storage area and form a work area for the server processor 300.

The server communicator 31, which includes a communication hardware device for communications according to a given communication standard, communicates with devices connected to the global network GN under the control of the server controller 30. The server communicator 31 communicates with the PC 1 and the smartphone 2.

The display application executor 201 causes the touch panel 22 to display the application UI 202. The display application executor 201 causes the touch panel 22 to display a document collection application UI 202A, which is a document list screen, and a selected document application UI 202B, which is a selected document screen. The document collection application UI 202A and the selected document application UI 202B will be described with reference to FIGS. 2 and 3.

Figure 2:
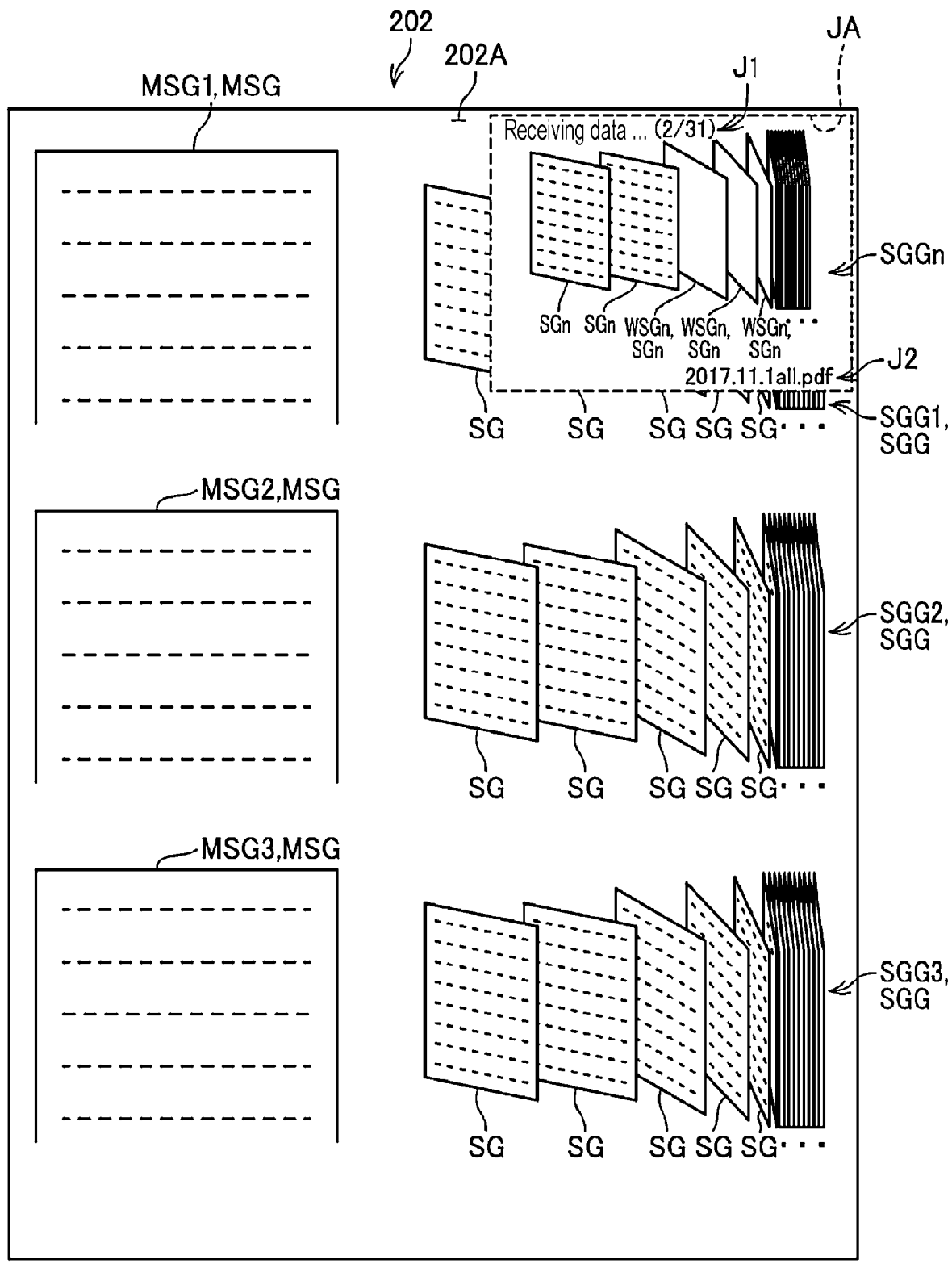
FIG. 2 illustrates an example of a document collection application user interface (UI) as a document list screen.

FIG. 2 illustrates an example of the document collection application UI 202A as a document list screen.

The document collection application UI 202A displays at a given position of the touch panel 22 a set of a first thumbnail image group SGG1 and a first main thumbnail image MSG1 based on first document data of a plurality of pieces of document data generated by the data generation application 111. The document collection application UI 202A also displays a set of a second thumbnail image group SGG2 and a second main thumbnail image MSG2 based on second document data of the plurality of pieces of document data. The set of the second thumbnail image group SGG2 and the second main thumbnail image MSG2 is displayed in a collected manner above or below the set of the first thumbnail image group SGG1 and the first main thumbnail image MSG1. When the document collection application UI 202A displays a set of a third thumbnail image group SGG3 and a third main thumbnail image MSG3 based on third document data on the touch panel 22, the set of the third thumbnail image group SGG3 and the third main thumbnail image MSG3 are displayed in the same manner as the set of the second thumbnail image group SGG2 and the second main thumbnail image MSG2. In the following description, when not distinguished from each other, the first thumbnail image group SGG1, the second thumbnail image group SGG2, and the third thumbnail image group SGG3 are referred to as a thumbnail image group SGG. When not distinguished from each other, the first main thumbnail image MSG1, the second main thumbnail image MSG2, and the third main thumbnail image MSG3 are referred to as a main thumbnail image MSG.

The thumbnail image group SGG is an image group of a plurality of thumbnail images SG aligned in the left-right direction of the touch panel 22. The aligned thumbnail images SG included in the thumbnail image group SGG appear in the display as if viewed from a higher point. One thumbnail image SG included in the thumbnail image group SGG corresponds to one page of a document represented by corresponding document data. One thumbnail image SG, as an image of a corresponding page, is an image displayed in accordance with a thumbnail image data element of a data size smaller than the data size of original document data or an image displayed in accordance with a thumbnail image data element in which images change faster than original document data. The main thumbnail image MSG is a thumbnail image SG corresponding to a representative page in document data. An example of the representative page is the first page in document data. The document collection application UI 202A may display, as the main thumbnail image MSG, a part of a thumbnail image SG of a page or the entire thumbnail image SG of the page.

On the document collection application UI 202A, a set of the thumbnail image group SGG and the main thumbnail image MSG can be selected by a touch input. When a set of the thumbnail image group SGG and the main thumbnail image MSG is selected on the document collection application UI 202A, the display application 211 causes the displayed screen to move from the document collection application UI 202A to the selected document application UI 202B as a selected document screen.

In the document collection application UI 202A illustrated in FIG. 2, a receive image display area JA is displayed. The receive image display area JA is displayed at an upper right part of the document collection application UI 202A in FIG. 2, but the receive image display area JA may be displayed at any position.

The receive image display area JA displays an nth thumbnail image group SGGn, where n is equal to or greater than 1. The nth thumbnail image group SGGn displayed at the receive image display area JA includes thumbnail images SGn represented by a thumbnail image data element generated in accordance with nth document data being processed by using the printer driver 112 of the PC 1. When nth document data is not being processed by using the printer driver 112 of the PC 1, the receive image display area JA is not displayed at the document collection application UI 202A.

In the receive image display area JA, the receive thumbnail images SGn included in the nth thumbnail image group SGGn change in accordance with the number of received thumbnail images SGn included in a plurality of received thumbnail image data elements. When the smartphone 2 receives no thumbnail image data element of any page, the receive thumbnail images SGn included in the nth thumbnail image group SGGn displayed at the receive image display area JA are all white images. In the following description, the white image is referred to as a white thumbnail image WSGn. When the smartphone 2 receives a thumbnail image data element, a white thumbnail image WSGn of a page corresponding to the received thumbnail image data element is replaced with a receive thumbnail image SGn represented by the received thumbnail image data element at the receive image display area JA. At the receive image display area JA, as the number of thumbnail image data elements received by the smartphone 2 increases, the number of the white thumbnail images WSGn included in the nth thumbnail image group SGGn decreases, and the number of the receive thumbnail images SGn represented by the received thumbnail image data elements increases.

The receive image display area JA displays, in addition to the nth thumbnail image group SGGn, received page count information J1 and document data name information J2.

The received page count information J1 includes information of the number of the thumbnail images SGn of pages represented by received thumbnail image data elements. The received page count information J1 indicates how many pages of the thumbnail images SGn represented by thumbnail image data elements have been received while the receive image display area JA is displayed. The received page count information J1 in FIG. 2 indicates that thumbnail image data elements corresponding to thumbnail images of two pages out of thirty-one pages have been received. When one thumbnail image data element corresponds to one page of the thumbnail image SG, the received page count information J1 in FIG. 2 denotes that two thumbnail image data elements have been received. The received page count information J1 indicates the count of pages of document data, that is, the number of pages of document data. The document data name information J2 indicates a name of document data corresponding to the nth thumbnail image group SGGn displayed at the receive image display area JA. The name of document data indicated by the document data name information J2 in FIG. 2 is "2017.11.1all.pdf".

At the receive image display area JA, the nth thumbnail image group SGGn can be selected by a touch input. When the nth thumbnail image group SGGn displayed at the receive image display area JA is selected, the document collection application UI 202A causes the displayed screen to move to the selected document application UI 202B.

Figure 3:
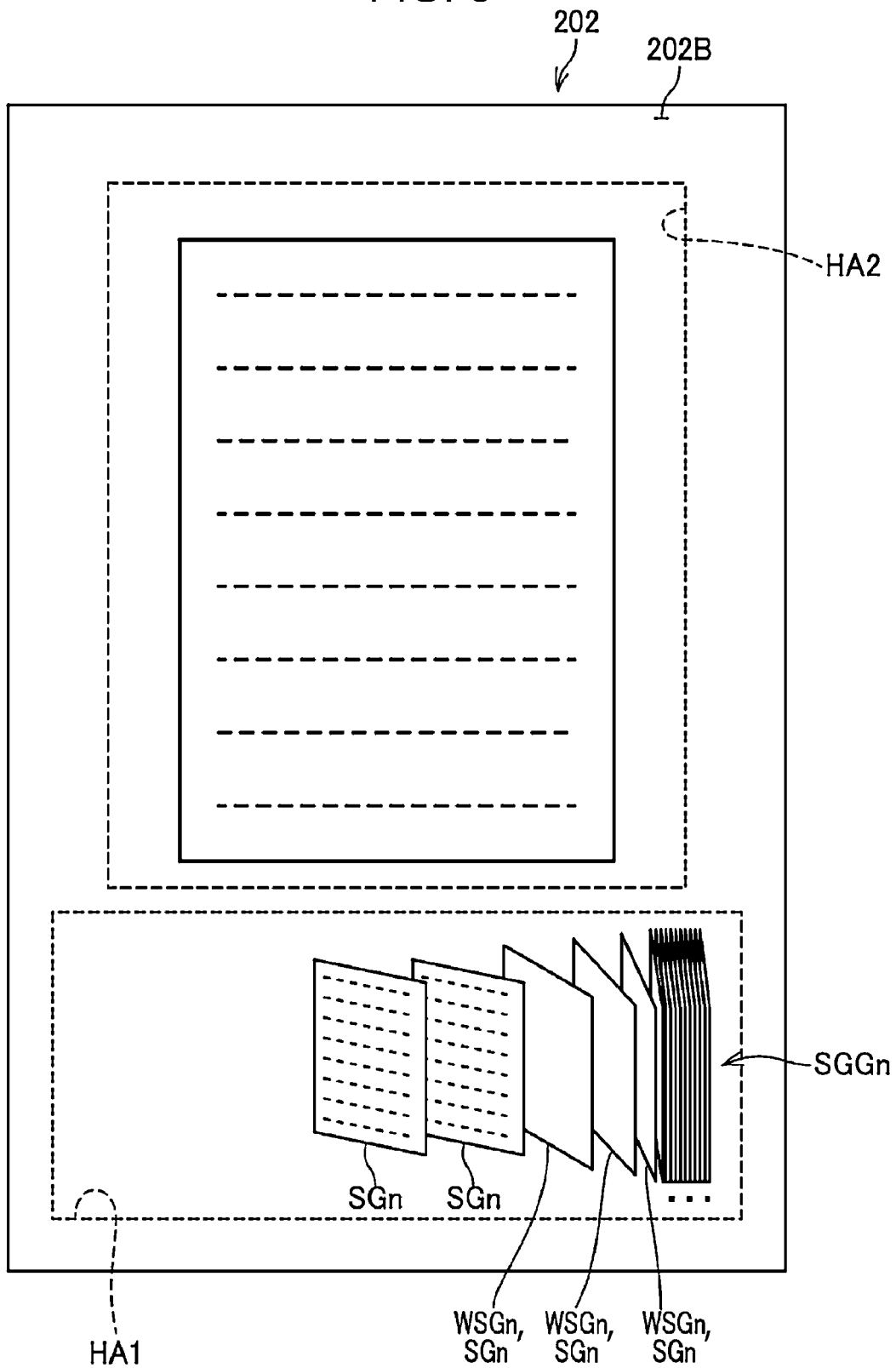
FIG. 3 illustrates an example of a selected document application UI as a selected document screen.

FIG. 3 illustrates an example of the selected document application UI 202B as a selected document screen.

The selected document application UI 202B includes a thumbnail image group display area HA1 and a selected page display area HA2.

The thumbnail image group display area HA1 is an area for displaying a thumbnail image group SGG selected on the document collection application UI 202A. For example, when the set of the first main thumbnail image MSG1 and the first thumbnail image group SGG1 are selected on the document collection application UI 202A, the thumbnail image group display area HA1 displays the first thumbnail image group SGG1 included in the selected set. When the nth thumbnail image group SGGn displayed at the receive image display area JA is selected, the thumbnail image group display area HA1 displays the nth thumbnail image group SGGn.

When the selected document application UI 202B displays the nth thumbnail image group SGGn of the receive image display area JA, the receive thumbnail images SGn included in the nth thumbnail image group SGGn also change in the thumbnail image group display area HA1 in accordance with the number of the received thumbnail images SG included in a plurality of received thumbnail image data elements, in the same manner as the receive image display area JA.

The thumbnail image group display area HA1 changes the display appearance of the thumbnail image group SGG when a predetermined touch input is performed. An example of the predetermined touch input is sliding operation, which is a touch input carried out by moving a pointing device in contact with the touch panel 22. When sliding operation to right is performed, the thumbnail images SG move one by one from left to right within the thumbnail image group display area HA1 in accordance with the amount of move of the pointing device to right on the touch panel 22. When sliding operation to left is performed, the thumbnail images SG move one by one from right to left within the thumbnail image group display area HA1 in accordance with the amount of move of the pointing device to left on the touch panel 22.

The selected page display area HA2 is an area for displaying a thumbnail image SG selected at the thumbnail image group display area HA1 or an image of a page corresponding to the thumbnail image SG selected at the thumbnail image group display area HA1. When the smartphone 2 has not received from the server 3 PDF document data of the page corresponding to the thumbnail image SG selected at the thumbnail image group display area HA1, the selected page display area HA2 displays the selected thumbnail image SG. When the smartphone 2 has received from the server 3 PDF document data of the page corresponding to the thumbnail image SG selected at the thumbnail image group display area HA1, the selected page display area HA2 displays a PDF image according to the PDF document data.

Figure 4:
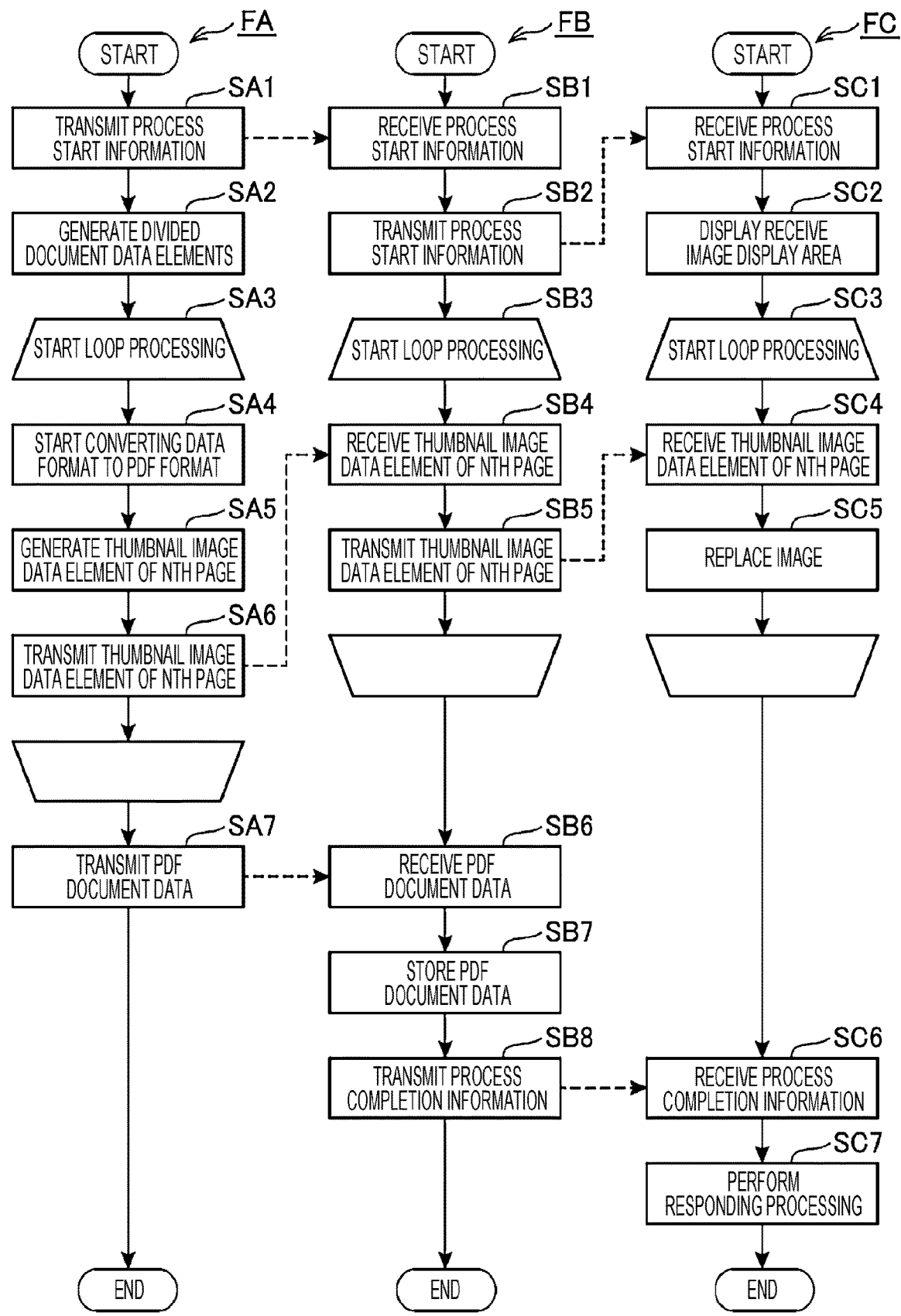
FIG. 4 provides flowcharts illustrating an operation of the communication system.

Next, an operation of the communication system 1000 will be described. FIG. 4 provides flowcharts illustrating an operation of the communication system 1000.

In FIG. 4, a flowchart FA illustrates an operation of the PC 1, a flowchart FB illustrates an operation of the server 3, and a flowchart FC illustrates an operation of the smartphone 2.

The operation illustrated in FIG. 4 indicates the case in which the data generation application executor 101 generates document data in another data format than the PDF format.

As illustrated in the flowchart FA, the driver executor 102 of the PC 1 controls the PC communicator 11 to transmit to the server 3 process start information indicating that transmitting of document data generated by using the data generation application 111 starts (step SA1).

The process start information includes document information. The document information indicates the count of pages, that is, the number of pages of a document represented by document data generated by using the data generation application 111 and a name of the document data. The driver executor 102 obtains document information from document data generated by the data generation application executor 101 and includes the document information in the process start information.

Referring to the flowchart FB, the server controller 30 of the server 3 controls the server communicator 31 to receive the process start information (step SB1).

The server controller 30 controls the server communicator 31 to transmit the received process start information to the smartphone 2 (step SB2).

Referring to the flowchart FC, the display application executor 201 of the smartphone 2 receives the process start information via the smartphone communicator 21 (step SC1).

The display application executor 201 displays, in accordance with the received process start information, the received page count information J1 and the document data name information J2 at the receive image display area JA of the document collection application UI 202A (step SC2).

In step SC2, which is immediately after the process start information is received, the receive image display area JA displays all white thumbnail images WSGn as the nth thumbnail image group SGGn. In the nth thumbnail image group SGGn, the number of the displayed white thumbnail images WSGn corresponds to the number of pages indicated by the document information included in the process start information. The receive image display area JA in step SC2 displays as the document data name information J2 the name indicated by the document information included in the process start information. The receive image display area JA in step SC2 also displays as the received page count information J1 information indicating that no thumbnail image data element has been received.

As illustrated in the flowchart FA, the driver executor 102 generates M pieces of divided document data elements formed by dividing document data of M pages into individual pages (step SA2). M is an integer equal to or greater than 2. When the dividing is according to the page unit, the number of pages is equal to the number of thumbnail image data elements. Two pieces out of the M pieces of divided document data elements correspond to an example of a first divided data element and a second divided data element.

After generating the plurality of divided document data elements, the driver executor 102 starts loop processing for the divided document data elements (step SA3).

The driver executor 102 starts converting the data format of a divided document data element of an Nth page into the PDF format (step SA4). N is an integer equal to or greater than 1 and equal to or less than M. A divided PDF document data element of the Nth page is generated by the converting and stored the PC memory 110 in the order of page.

The driver executor 102 generates a thumbnail image data element representing a thumbnail image SG of the Nth page in accordance with the divided document data element of the Nth page (step SA5).

The driver executor 102 transmits the thumbnail image data element generated in step SA5 to the server 3 via the PC communicator 11 (step SA6). The driver executor 102 assigns a page number indicating the Nth page to the thumbnail image data element to be transmitted. The driver executor 102 assigns a page number indicating the first page to a thumbnail image data element of the first page.

The driver executor 102 repeats the processing operations in steps SA5 and SA6 until the processing operations in steps SA5 and SA6 are completed for all the M pieces of divided document data elements. Specifically, the driver executor 102 repeats steps SA5 and SA6 until converting into PDF, generating thumbnail image data elements, and transmitting thumbnail image data elements are completed for all pages of document data. Steps SA5 and SA6 may be performed sequentially by following the flowchart or simultaneously. The driver executor 102 may perform firstly step SA6 and then step SA5.

The driver executor 102 performs a processing operation in step SA7 while or after the processing operations in steps SA5 and SA6 are performed for the M pieces of divided document data elements.

As illustrated in the flowchart FB, after performing the processing operation in step SB2, the server controller 30 of the server 3 starts loop processing to transmit and receive a plurality of thumbnail image data elements (step SB3).

The server controller 30 controls the server communicator 31 to receive the thumbnail image data element of the Nth page from the PC 1 (step SB4).

The server controller 30 controls the server communicator 31 to transmit the received thumbnail image data element of the Nth page to the smartphone 2 (step SB5).

The server controller 30 repeats the processing operations in steps SB4 and SB5 until all thumbnail image data elements are received and transmitted. The server controller 30 determines, in accordance with the number of pages indicated by the document information included in the process start information received in step SB1, whether all thumbnail image data elements have been received and transmitted.

The server controller 30 receives and transmits all thumbnail image data elements and then ends the loop processing started in step SB3. The server controller 30 performs a processing operation in step SB6 while or after step SB5 is performed.

Referring to the flowchart FC, after performing the processing operation in step SC2, the display application executor 201 of the smartphone 2 starts loop processing for the thumbnail image SG (step SC3).

The display application executor 201 receives the thumbnail image data element of the Nth page from the server 3 via the smartphone communicator 21 (step SC4).

The display application executor 201 replaces a white thumbnail image WSGn corresponding to the page number indicating the Nth page, which has been assigned to the thumbnail image data element of the Nth page, with a receive thumbnail image SGn represented by the received thumbnail image data element (step SC5). In the nth thumbnail image group SGGn displayed at the receive image display area JA and the nth thumbnail image group SGGn displayed at the thumbnail image group display area HA1, the display application executor 201 replaces the white thumbnail images WSGn with the receive thumbnail images SGn represented by received thumbnail image data elements.

The display application executor 201 repeats the processing operations in steps SC4 and SC5 until all thumbnail image data elements are received and all the white thumbnail images WSGn are replaced with the receive thumbnail images SGn.

After receiving all thumbnail image data elements and performing replacement of the thumbnail images SG, the display application executor 201 ends the loop processing started in step SC3.

As illustrated in the flowchart FA, the driver executor 102 transmits PDF document data formed by converting all pages into the PDF format to the server 3 via the PC communicator 11 (step SA7).

As illustrated in the flowchart FB, the server controller 30 of the server 3 controls the server communicator 31 to receive the PDF document data (step SB6) and controls the server memory 310 to store the received PDF document data (step SB7).

The server controller 30 controls the server communicator 31 to transmit to the smartphone 2 process completion information indicating that the process for the document data generated by using the data generation application 111 has been completed (step SB8). The PC 1 may transmit the process completion information to the server 3 after the PC 1 completes the process for the document data generated by using the data generation application 111.

As illustrated in the flowchart FC, the display application executor 201 of the smartphone 2 receives the process completion information from the server 3 via the smartphone communicator 21 (step SC6).

The display application executor 201 performs a processing operation responding to the receiving of the process completion information (step SC7).

The processing operation responding to the receiving of the process completion information includes a processing operation of ending displaying the receive image display area and a processing operation of displaying a set of the nth thumbnail image group SGGn, which has been displayed at the receive image display area JA, and an nth main thumbnail image MSGn on the document collection application UI 202A. The processing operation responding to the receiving of the process completion information may further include a processing operation of sending a notification that thumbnail image data elements of all pages have been received.

FIG. 4 indicates the case in which the data generation application executor 101 generates document data in another data format than the PDF format. When the data generation application executor 101 generates document data in the PDF format, the driver executor 102 does not perform the processing operation in step SA4. When the data generation application executor 101 generates document data in the PDF format, the driver executor 102 does not convert the data format.

The following is a description of an operation of the communication system 1000 when the smartphone 2 receives PDF document data from the server 3.

Figure 5:
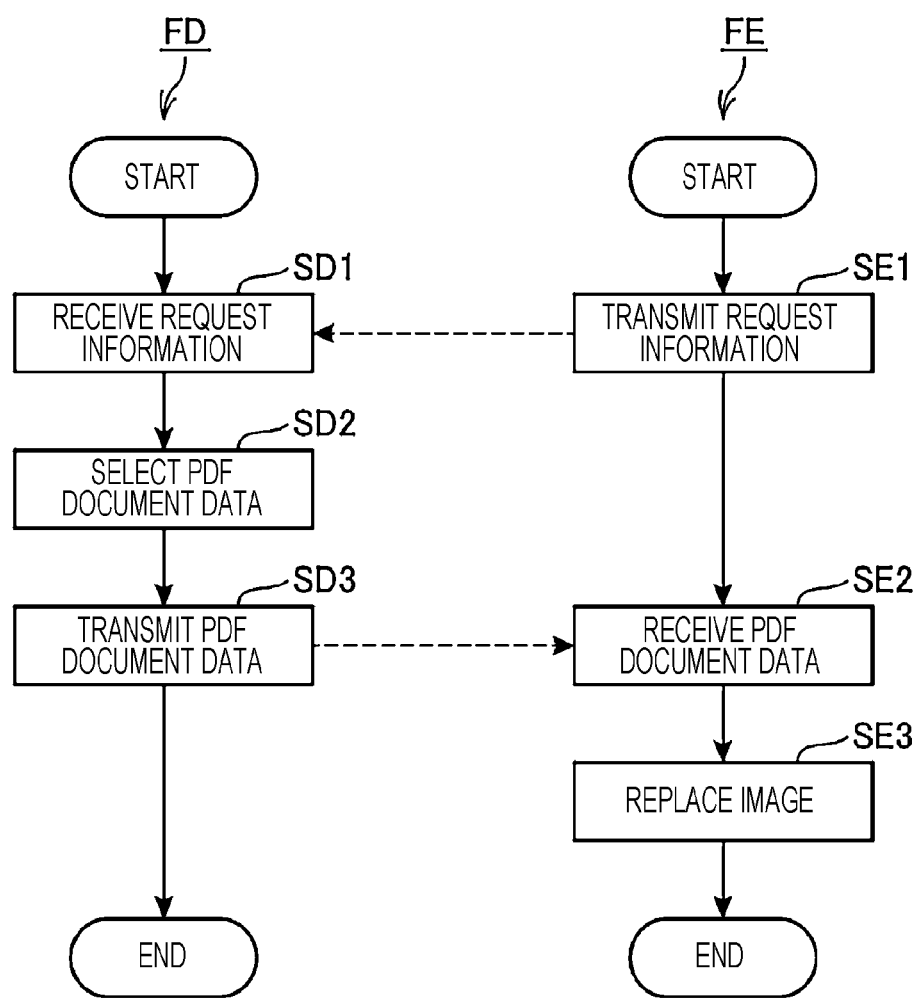
FIG. 5 provides flowcharts illustrating an operation of the communication system.

FIG. 5 provides flowcharts illustrating an operation of the communication system 1000. In FIG. 5, a flowchart FD illustrates an operation of the server 3, and a flowchart FE illustrates an operation of the smartphone 2.

As illustrated in the flowchart FE, the display application executor 201 of the smartphone 2 transmits request information for requesting PDF document data to the server 3 via the smartphone communicator 21 (step SE1).

The request information includes identification information for identifying PDF document data. The identification information is transmitted by the PC 1 to the smartphone 2 via the server 3 when the process start information or the process completion information is received, and the identification information is stored in the smartphone memory 210.

As illustrated in the flowchart FD, the server controller 30 of the server 3 controls the server communicator 31 to receive the request information (step SD1) and selects in the server memory 310 PDF document data to be transmitted in response to the request information in accordance with the identification information included in the received request information (step SD2).

The server memory 310 stores PDF document data in association with identification information. The server controller 30 selects in the server memory 310 a particular piece of PDF document data associated with a particular piece of identification information included in the received request information.

The server controller 30 controls the server communicator 31 to transmit the PDF document data selected in step SD2 to the smartphone 2 (step SD3).

As illustrated in the flowchart FE, the display application executor 201 of the smartphone 2 receives the PDF document data via the smartphone communicator 21 (step SE2). The display application executor 201 replaces a thumbnail image SG represented by a thumbnail image data element displayed at the selected page display area HA2 with a PDF image represented by the received PDF document data (step SE3). The PDF image represented by the received PDF document data corresponds to an example of a display thumbnail image. In this manner, the selected page display area HA2 displays a display thumbnail image based on PDF document data that is, for example, editable by users.

Second Embodiment

The driver executor 102 according to a second embodiment generates a thumbnail image data element corresponding to the first page or thumbnail image data elements corresponding to the first page to a given page at a resolution higher than the resolution for thumbnail image data elements corresponding to other pages constituting a document represented by document data. This configuration can suppress increases in communication load for transmitting thumbnail image data elements, while displaying the first page or the first page to a given page of the document in a more visible manner.

Third Embodiment

In the first embodiment described above, thumbnail image data elements are transmitted page by page. The driver executor 102 according to a third embodiment transmits a plurality of pages of thumbnail image data elements together to the server 3. This configuration enables the PC 1 to perform communications less often. The driver executor 102 may generate divided document data elements of a plurality of pages from document data and generate thumbnail image data elements based on the generated divided document data elements of the plurality of pages. In accordance with the thumbnail image data elements based on the generated divided document data elements of the plurality of pages, the smartphone 2 displays a plurality of thumbnail images SG.

Fourth Embodiment

In the first embodiment described above, PDF document data containing all pages is transmitted to the server 3. Instead of PDF document data containing all pages, the driver executor 102 according to a fourth embodiment transmits, after PDF conversion is completed, divided PDF document data elements page by page or batch by batch to the server 3. The driver executor 102 according to the fourth embodiment transmits to the server 3 divided PDF document data elements formed by converting divided document data elements corresponding to transmitted thumbnail image data elements into the PDF format. The server controller 30 of the server 3 may transmit the received divided PDF document data elements page by page or batch by batch to the smartphone 2. This configuration enables the server 3 to obtain part of PDF document data earlier than when PDF document data containing all pages are transmitted to the server 3, and the smartphone 2 can in turn display PDF document data early.

Fifth Embodiment

In the first embodiment described above, the white thumbnail images WSGn are replaced with the receive thumbnail images SGn represented by received thumbnail image data elements in the nth thumbnail image group SGGn displayed at the receive image display area JA and the nth thumbnail image group SGGn displayed at the thumbnail image group display area HA1. In a fifth embodiment, no white thumbnail image WSGn is displayed in each area. In the fifth embodiment, whenever the smartphone 2 receives a thumbnail image data element, a thumbnail image SG represented by the received thumbnail image data element is additionally displayed in corresponding areas. In the fifth embodiment, process start information does not necessarily include document information.

Sixth Embodiment

In the first embodiment described above, document data generated by the driver executor 102 using the data generation application executor 101 is divided into pages. In the first embodiment, pages are used as predetermined units. In the sixth embodiment, document data generated by the driver executor 102 using the data generation application executor 101 is divided into units based on a data size used as the predetermined units. In the sixth embodiment, when one divided document data element contains a plurality of pages, a plurality of thumbnail images SG can be displayed by using one thumbnail image data element. This configuration enables the PC 1 to perform communications less often.

The embodiments described above can achieve the effects described later. A first divided document data element and a second divided document data element used in the following description of the effects do not indicate particular divided document data elements. The first divided document data element indicates one divided document data element formed by dividing document data into the predetermined units, and the second divided document data element indicates another divided document data element different from the first divided document data element. A first thumbnail image data element and a second thumbnail image data element used in the following description of the effects do not indicate particular thumbnail image data elements. The first thumbnail image data element indicates a thumbnail image data element based on the first divided document data element, and the second thumbnail image data element indicates a thumbnail image data element based on the second divided document data element.

In the communication method for the PC 1 configured to transmit document data constituted by a plurality of pages, the PC 1 generates the first divided document data element and the second divided document data element by dividing document data into the predetermined units. The PC 1 generates the first thumbnail image data element in accordance with the generated first divided document data element and transmits the generated first thumbnail image data element. The PC 1 also generates the second thumbnail image data element in accordance with the generated second divided document data element and transmits the second thumbnail image data element. In the communication method for the PC 1, after the PC 1 transmits the first thumbnail image data element, the PC 1 starts transmitting document data.

With this configuration, the PC 1 divides document data into the predetermined units; and before transmitting document data, the PC 1 transmits a thumbnail image data element based on a divided document data element corresponding to a part of document data. As a result, the smartphone 2 as the destination can speedily display the document represented by the document data.

In the communication method for the PC 1, the PC 1 transmits the document data to the printer driver 112; the first divided document data element and the second divided document data element are generated by using the printer driver 112, and the first thumbnail image data element and the second thumbnail image data element are generated by using the printer driver 112.

With this configuration, the printer driver 112 installed in the PC 1 enables the PC 1 to cause the smartphone 2 to speedily display a document.

In the communication method for the PC 1, when the data format of the document data is the PDF format, the first divided document data element and the second divided document data element are generated without converting the data format; and when the data format of the document data is another format than the PDF format, the first divided document data element and the second divided document data element are generated in the PDF format after conversion, and the document data is transmitted after the data format of the document data is converted to the PDF format.

With this configuration, the data format of document data to be transmitted can be converted to the PDF format regardless of the original data format, and thus, the data format is always the PDF format when the devices other than the PC 1, namely the smartphone 2 and the server 3, process document data.

In the communication method for the PC 1, document information including the count of pages constituting the document data is obtained, and the obtained document information is transmitted before the first thumbnail image data element is transmitted.

With this configuration, the smartphone 2 can perform processing in accordance with the count of pages of document data.

In the communication method for the PC 1, the first thumbnail image data element and the second thumbnail image data element are transmitted through a path for push transmission.

With this configuration, the smartphone 2 can receive thumbnail image data elements without sending a request to the server 3, and consequently, the smartphone 2 can more speedily display a document represented by document data.

The predetermined units are pages constituting the document data.

With this configuration, the smartphone 2 can speedily display in a page-by-page manner a document represented by document data.

The predetermined units are units based on a data size of the document data.

With this configuration, the smartphone 2 can speedily display a document represented by document data in accordance with units based on a data size. Because the dividing is according to the units based on a data size, costs for communication can be suppressed.

The printer driver 112 causes the PC processor 100 to generate the first divided document data element and the second divided document data element by dividing document data in accordance with a predetermined unit. The printer driver 112 causes the PC processor 100 to generate the first thumbnail image data element in accordance with the first divided document data element and transmit the generated first thumbnail image data element. The printer driver 112 causes the PC processor 100 to generate the second thumbnail image data element in accordance with the generated second divided document data element. The printer driver 112 causes the PC processor 100 to transmit the generated second thumbnail image data element. The printer driver 112 causes the PC processor 100 to start transmitting the document data after transmitting the first thumbnail image data element.

The printer driver 112 can achieve the same effects as the effects of the communication method for the PC 1.

The communication system 1000 includes the server 3, the PC 1 configured to transmit document data constituted by a plurality of pages to the server 3, and the smartphone 2 configured to display the document data transmitted by the PC 1 via the server 3. The PC 1 generates the first divided document data element and the second divided document data element by dividing the document data into the predetermined units. The PC 1 generates the first thumbnail image data element in accordance with the generated first divided document data element. The PC 1 transmits the generated first thumbnail image data element to the smartphone 2. The PC 1 generates the second thumbnail image data element in accordance with the generated second divided document data element. The PC 1 transmits the generated second thumbnail image data element to the smartphone 2. After transmitting the first thumbnail image data element, the PC 1 transmits the first divided document data element and the second divided document data element to the smartphone 2. The smartphone 2 receives the first thumbnail image data element and displays a thumbnail image SG represented by the received first thumbnail image data element. The smartphone 2 receives the second thumbnail image data element and displays a thumbnail image SG represented by the received second thumbnail image data element. When receiving the first divided document data element, the smartphone 2 generates a PDF image in accordance with the first divided document data element and displays the generated PDF image as a replacement for the thumbnail image SG represented by the thumbnail image data element.

The communication system 1000 can achieve the same effects as the effects of the communication method for the PC 1. When the smartphone 2 receives a divided document data element, the smartphone 2 displays a PDF image as a replacement for a corresponding thumbnail image data element, and as a result, the document can be subjected to processing operations such as editing on the smartphone 2.

The embodiments described above illustrate some aspects of the present disclosure and can be changed or used in any manner.

Although the PDF format exemplifies the first data format in the embodiments, the first data format is not limited to the PDF format.

The function of the PC controller 10, the function of the smartphone controller 20, and function of the server controller 30 may be implemented by, for example, a plurality of processors or semiconductor chips.

The units illustrated in FIG. 1 are mere examples and should not be construed in a limiting sense. Hardware devices are not necessarily provided to implement the respective units, and a single processor can implement the functions of the units by running a program. One or more of the functions implemented by using software may be implemented by using hardware; or one or more of the functions implemented by using hardware may be implemented by using software. In addition, specific configurations of the devices in the communication system 1000 can be changed as appropriate.

The step units of operations illustrated in FIGS. 4 and 5 are determined by division based on the main processing contents for ease of understanding of the operation of the communication system 1000, and the present disclosure is not limited by the method of division of processing units or the names of the processing units. Depending on the processing contents, the operations may be divided into step units more than the step units in the embodiment. In addition, the division may be performed in a manner in which one step unit includes more processing operations. The order of steps is changeable as appropriate.

What is claimed is:

1. A communication method for a transmission device configured to transmit document data constituted by a plurality of pages, comprising:
    generating a first divided data element and a second divided data element by dividing the document data into predetermined units;
    generating a first thumbnail image data element in accordance with the generated first divided data element;
    transmitting the generated first thumbnail image data element;
    generating a second thumbnail image data element in accordance with the generated second divided data element;

transmitting the generated second thumbnail image data element; and
after transmitting the first thumbnail image data element, starting transmitting the document data.

2. The communication method according to claim 1, further comprising:
transmitting the document data to a printer driver, wherein the first divided data element and the second divided data element are generated by using the printer driver, and
the first thumbnail image data element and the second thumbnail image data element are generated by using the printer driver.

3. The communication method according to claim 1, wherein
when a data format of the document data is a first data format, the first divided data element and the second divided data element are generated without converting the data format, and
when the data format of the document data is a second data format, the document data is transmitted after the data format is converted from the second data format to the first data format.

4. The communication method according to claim 3, wherein
the first data format is Portable Document Format (PDF).

5. The communication method according to claim 1, further comprising:
obtaining document information including a count of the plurality of pages constituting the document data; and
transmitting the obtained document information before transmitting the first thumbnail image data element.

6. The communication method according to claim 1, wherein
the first thumbnail image data element and the second thumbnail image data element are transmitted through a path for push transmission.

7. The communication method according to claim 1, wherein
the predetermined units are pages constituting the document data.

8. The communication method according to claim 1, wherein
the predetermined units are units based on a data size of the document data.

9. A non-transitory computer-readable storage medium storing a program to be executed by a computer serving as a transmission device configured to transmit document data constituted by a plurality of pages, the program comprising:
generating a first divided data element and a second divided data element by dividing the document data into predetermined units;
generating a first thumbnail image data element in accordance with the generated first divided data element;
transmitting the generated first thumbnail image data element;
generating a second thumbnail image data element in accordance with the generated second divided data element;
transmitting the generated second thumbnail image data element; and
after transmitting the first thumbnail image data element, starting transmitting the document data.

10. The non-transitory computer-readable storage medium according to claim 9, wherein
the program is a printer driver.

11. The non-transitory computer-readable storage medium according to claim 9, wherein when a data format of the document data is a first data format, the first divided data element and the second divided data element are generated without converting the data format, and
when the data format of the document data is a second data format, the document data is transmitted after the data format is converted from the second data format to the first data format.

12. The non-transitory computer-readable storage medium according to claim 11, wherein
the first data format is PDF.

13. The non-transitory computer-readable storage medium according to claim 9, the program further comprising:
obtaining document information including a count of the plurality of pages constituting the document data; and
transmitting the obtained document information before transmitting the first thumbnail image data element.

14. The non-transitory computer-readable storage medium according to claim 9, wherein
the first thumbnail image data element and the second thumbnail image data element are transmitted through a path for push transmission.

15. The non-transitory computer-readable storage medium according to claim 9, wherein
the predetermined units are pages constituting the document data.

16. A communication system comprising:
a server;
a transmission device configured to transmit document data constituted by a plurality of pages to the server; and
a display terminal configured to display the document data transmitted by the transmission device via the server, wherein
the transmission device includes
an executor configured to execute a printer driver for generating a first divided data element and a second divided data element by dividing the document data into predetermined units and for generating a first thumbnail image data element in accordance with the generated first divided data element and a second thumbnail image data element in accordance with the generated second divided data element, and
a communicator configured to
transmit the first thumbnail image data element to the server,
after transmitting the first thumbnail image data element, transmit the second thumbnail image data element to the server, and
after transmitting the first thumbnail image data element, transmit the first divided data element and the second divided data element,
the server includes
a memory configured to store the first thumbnail image data element, the second thumbnail image data element, the first divided data element, and the second divided data element that are transmitted by the transmission device, and
a server communicator configured to
transmit the first thumbnail image data element and the second thumbnail image data element,
transmit the first divided data element after transmitting the first thumbnail image data element, and
transmit the second divided data element after transmitting the second thumbnail image data element, and the display terminal includes
- a terminal communicator configured to receive the first thumbnail image data element, the second thumbnail image data element, the first divided data element, and the second divided data element,
- a display configured to display a first thumbnail image represented by the first thumbnail image data element and a second thumbnail image represented by the second thumbnail image data element, and
- a terminal controller configured to control displaying on the display, the terminal controller being configured to generate a display thumbnail image in accordance with the received first divided data element and display the generated display thumbnail image as a replacement for the first thumbnail image.

17. The communication system according to claim 16, wherein
the executor of the transmission device is configured to
- when the document data is formatted in a first data format, generate the first divided data element and the second divided data element without converting the document data from the first data format; and
- when the document data is formatted in a second data format, convert the document data from the second data format to the first data format and transmit the converted document data.

18. The communication system according to claim 17, wherein
the first data format is PDF.

19. The communication system according to claim 16, wherein
the executor of the transmission device is configured to obtain document information including a count of the plurality of pages constituting the document data, and
the communicator of the transmission device is configured to transmit the obtained document information before transmitting the first thumbnail image data element.

20. The communication system according to claim 16, wherein
the communicator of the transmission device is configured to transmit the first thumbnail image data element and the second thumbnail image data element through a path for push transmission.

* * * * *